J. BECKER.
AMMONIA AND TAR RECOVERY PROCESS.
APPLICATION FILED AUG. 25, 1919.
1,375,485.
Patented Apr. 19, 1921.
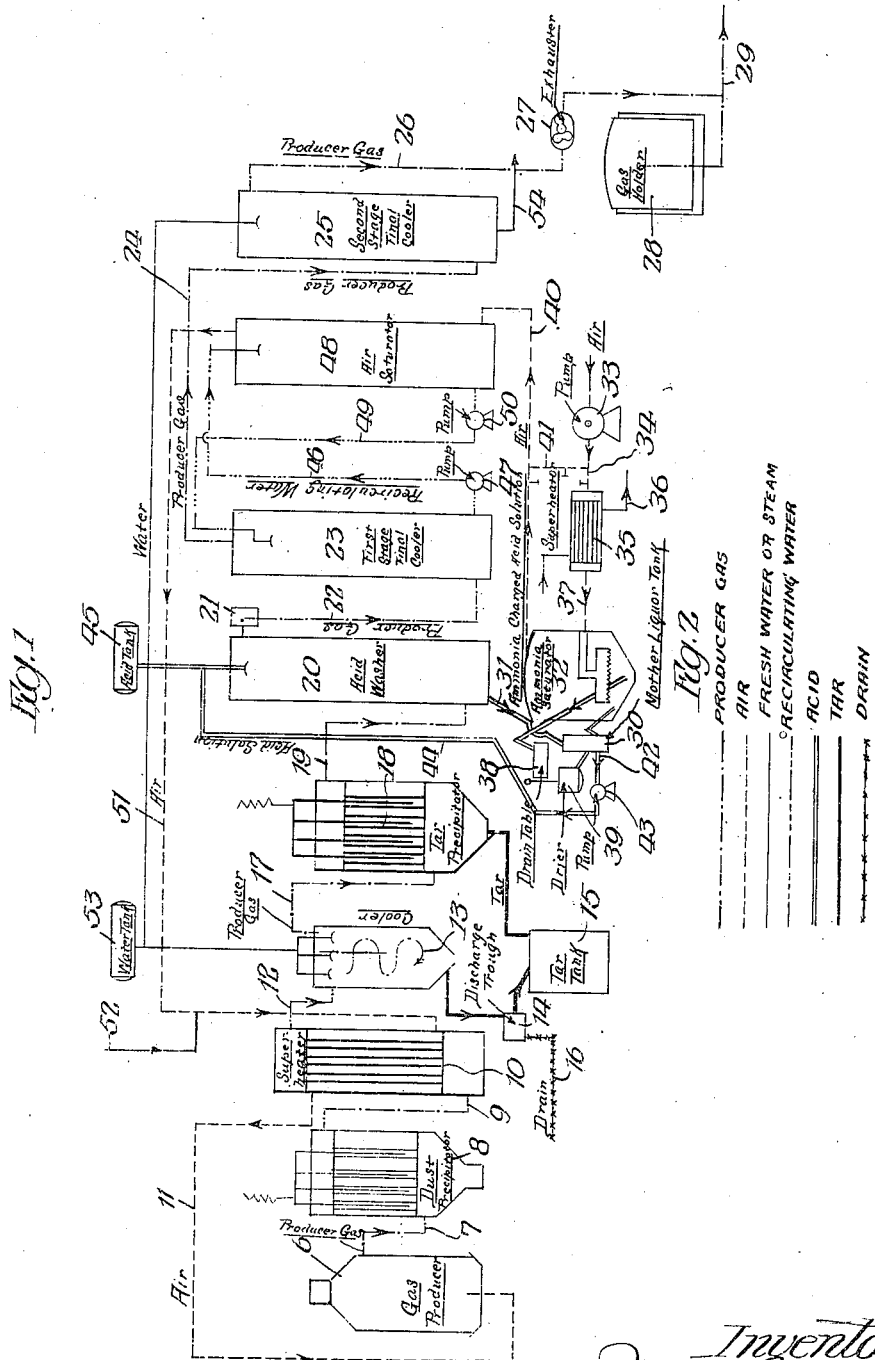

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,375,485.     Specification of Letters Patent.     Patented Apr. 19, 1921.

Application filed August 25, 1919. Serial No. 319,811.

*To all whom it may concern:*

Be it known that I, JOSEPH BECKER, a citizen of the United States, residing in Pittsburgh, in the county of Allegheny and State of Pennsylvania, have invented a new and useful Improvement in Ammonia and Tar Recovery Processes, of which the following is a specification.

This invention relates primarily to the recovery of tar and of ammonia from ammonia and tar charged gas and has for its essential object the efficient production of a clean, dust-free and high-grade tar and of a clean, tar-free and dry ammonium sulfate that has a high content of ammonia and is of the large crystal type, and is produced with great economy of heat or steam and with simplicity and directness in the operation of apparatus.

The invention is of particular utility in connection with a process for the recovery of tar and ammonia from producer-gas, as disclosed in my prior Patent No. 1,307,533, dated June 24, 1919. For convenience, the present description will be confined to this particular use of the invention; it will be understood, however, that the invention is capable of other applications, for example, it may be applied to the treatment of a gas, or gases, otherwise derived from the carbonization of coal, and it is manifest that the invention is by no means limited in scope to the particular application herein described. The invention may also have such other objects and results as are found to obtain in the processes hereinafter set forth and claimed.

In the accompanying drawing:

Figure 1 is a conventional diagram illustrating an embodiment of the invention in a preferred arrangement of apparatus for practising its processes;

Fig. 2 is a key to the symbols employed in the various lines that show the connections between the apparatus indicated in Fig. 1.

Referring to the drawing, there is indicated at 6 a producer, from which the evolved producer-gas passes through the gas-line 7 to the electrical precipitator 8. The producer-gas entering this electrical precipitator is still at a very high temperature, about 450° C., and its water saturation point is only about 80° C.; therefore, it is still greatly superheated with respect to its water and tar, and these, and its other vaporizable content are carried as vapor into and through the precipitator 8; the precipitator acts only to free the passing gas from dust and other solid impurities in its current.

From said precipitator 8, the gas, without having undergone appreciable cooling, passes through the gas-line 9 to the super-heater 10, through which it flows in counter-current with the saturated air that is on the way to the producer. This saturated air has a temperature above 80° C., when it enters the said super-heater 10; and, as a result of the heat interchange in passing through the super-heater, the gas issues with its temperature reduced to about 280° C., and the air issues with its temperature raised to about 250° C. At such temperature the air passes through the air-line 11 to the grate of the gas-producer 6. The partially cooled gas from the said super-heater 10 passes through the gas-line 12, still carrying its water and tar as vapor, to the water-sprayed cooler 13, which preferably is of the character of a cyclone precipitator and has the primary function of further cooling the gas to a large extent and the incidental function of further cleaning such gas by precipitating the residue of dust and other solid impurities. A slight amount of the tar may also be taken out in said cooler 13, which is drained from its discharge trough 14 into the tar tank 15, the waste water from said trough 14 discharging through the out'at pipe 16. But nearly all of the tar is carried through said cooler as vapor in the gas, because the gas enters, as above mentioned, at a temperature of about 280° C. and leaving said cooler is still super-heated although cooled down toward about 90° C.

The gas passes through the gas-line 17 to the electrical precipitator 18, which it enters at a temperature of about 90° C., and at such temperature the tar, approaching the character of a finely comminuted mist will be precipitated; the clean tar so precipitated is discharged into the tar tank 15. The gas passes from said tar-precipitator 18 through the gas-line 19 to the hot acid-water tower 20, which it enters at a temperature of about 85° C., still a little above its saturation point of 80° C. In said acid-tower, the ammonia is absorbed from the gas, and the ammonia-freed gas leaves the acid-washer at a temperature of about 82° C., still slightly above its saturation point of 80° C., the acid-solution being kept hot by the absorption reaction so that there cannot be any dilution of the ammonia-absorbing acid-solution that is flowing through said acid-washer, and by reason of the little super-heat remaining in the gas practically no water is picked up by the gas in passing through said acid-washer, and hence there is no precipitation of ammonium sulfate in said acid-washer. Thence the ammonia-freed gas flows through the separator 21, in which it is freed of such acid as it may carry with it and then flows through the gas-line 22 to the first-stage final-cooler 23, through which it flows in counter-current with warm water that enters such cooler at about 50° C. In this cooler, the gas is cooled to about 65° C. and to a great extent dehydrated, and thence passes, through the gas-line 24 to the second-stage final-cooler 25 through which it passes in counter-current with cold water at a temperature of about 25° C. and issues finally dehydrated and cooled to a temperature of about 25° C.

Such clean, cool and relatively dry gas is drawn off through the gas-line 26 by the exhauster 27 which forwards it to the gas-holder 28. From the gas-holder 28 the gas may pass through a gas-line 29 to whatever use it may be employed in. The ammonia-charged acid-solution from the aforesaid acid-washer 20 is conveyed to the mother-liquor tank 30 through the acid line 31, and from the said mother-liquor tank 30 the ammonia-charged acid-solution passes into the ammonia-saturator 32, in which is effected substantially the entire deposition of the ammonium sulfate, by passing therethrough an extraneously derived neutral gaseous evaporating medium, such as air, which acts as substantially the sole carrier for the evaporation requisite to effect the deposition of the ammonium sulfate. The air which is subsequently saturated and super-heated before it is forwarded to the grate of the gas-producer is drawn in from the outside through a fan 33 and thence is forwarded through the air-line 34 to and through a small super-heater 35. In said super-heater 35 the air is preheated by passing it in counter-current with indirect steam flowing in the steam line 36. The outside air enters said super-heater 35 at a temperature of about 25° C. and as a result of the heat interchange between the air and the steam in the super-heater 35, the air leaves said super-heater 35 with its temperature raised a little and passes through the air-line 37 to the ammonia-saturator 32. The somewhat super-heated air that flows into and through the saturation-bath in said saturator 32, serves to effect the evaporation requisite to precipitate the ammonium sulfate, in the ordinary manner of such precipitation in a saturator; and this ammonium sulfate is drawn off from the saturator in the usual manner and passes through the drain-table 38 and into the centrifugal drier 39, from which it is discharged to the usual conveyer-belt, which carries it to the storage pile of the by-product house. This ammonium sulfate has the dry, clean and large crystal character and high ammonia content, of the high grade ammonium sulfate that may be derived from the saturator-processing of coke-oven gas. During this evaporation process, the superheat of the air passing through the mother-liquor is somewhat reduced from the superheat at which the air enters the ammonia-saturator 32, because of the tension depression by the ammonia-charged acid-solution in the saturator. Nevertheless the air is heated above its outside temperature of 25° C., when it leaves the saturator 32; and said air leaves the saturator at approximately 52° C. and is then conducted through an air line 40 to the air-saturator tower 48 in which it is saturated, as will be hereinafter set forth. If desired a portion of the air drawn in by the air fan 33 may be by-passed directly to the air line 40 through the by-pass 41. This air will mingle with the air coming from the saturator 32. The by-pass 41 may however be cut out and the entire supply of outside air may be conducted through the small super-heater 35 to the ammonia saturator 32.

The use of such air, for the evaporation of water in the ammonia-charged acid-solution to effect the deposition of ammonium sulfate, raises the temperature of the air during its passage through the ammonia-saturator 32. The air is still super-heated as it enters the air-saturator tower and is capable of absorbing more water vapor in the air-saturator tower than would be the case should the air of atmospheric temperature be introduced into the air-saturator tower. As the air is thus capable of absorbing more water vapor in the air-saturator tower, the quantity of steam added to the air before it enters the super-heater 10 may be proportionately reduced, with the result that a large quantity of steam is saved.

The acid-solution from the drain-table 38 is received in the mother-liquor tank 30 which also receives from the acid-line 31 the acid-solution that by-passes the saturator; and the acid-solution received in said mother-liquor tank 30 is drawn through the further acid-line 42 to the acid-pump 43 and thence is forwarded through the return acid-line 44 to the acid-washer 20. The acid-washer 20 receives also fresh acid from the acid tank 45, such returned acid solution being still sufficiently heated to prevent cooling of the acid-solution that is receiving heat from the absorption reaction in such acid-washer. A continuous circulation of hot acid-solution is maintained through the acid-washer and thence to the saturator 32, and back to the acid-washer.

The aforesaid first-stage final-cooler 23 receives its water at a temperature of about 50° C. and discharges it at a temperature of about 80° C. and such discharged hot water is forced through the hot-water line 46 by the hot-water pump 47 to the air-saturator 48; and from that tower, the water issues cooled to a temperature of about 50° C. and is forced through the warm water line 49 by the water pump 50 to the said first-stage final-cooler 23 in which the ammonia freed producer-gas undergoes the first stage of its final cooling.

The air that is saturated and super-heated and led to the gas-producer, as before mentioned, passes from the ammonia-saturator 32 through the air-line 40 to the aforesaid air-saturator tower 48 which it enters at a temperature of about 52° C. In this tower 48 the air passing through the water introduced from the before-mentioned hot-water line 46, is heated and takes up water vapor and issues charged with water vapor, at a temperature somewhat above 80° C. and passes through the air-line 51 to the before-mentioned super-heater 10, through which it passes in counter-current with the hot producer gas, as also before mentioned, and is thereby super-heated to about 250° C. and passes out and to the gas-producer 6 through the super-heated air-line 11. Before the air enters the super-heater 10 a quantity of steam is introduced into the air through the steam line 52, in order to further charge the air from the air-saturator tower 48 with water vapor, before said air is subjected to the great rise in temperature in the super-heater 10. The addition of this steam insures delivery to the producer of air charged with the proper proportion of water vapor, to effect desired production of gas in the producer, the saturation point of the air being raised in the super-heater 10 owing to the exceedingly high temperature imparted to the air in said super-heater.

The fresh water tank for the coolers 13 and 25 is indicated at 53, and the drains from these coolers are at 16 and 54 respectively.

The processes of the invention may be practised in various ways, other than the particular embodiment that has been described for purposes of illustration, and still be within the scope and subject matter of the claims hereinafter made.

I claim:

1. In a process for the recovery of ammonia from producer gas, the combination of steps that consists in: absorbing the ammonia from dust freed and tar freed producer gas by passing such gas, at nearly its saturation temperature, through an acid wash; conveying the mother liquor from such acid wash to a saturation bath; then effecting substantially the entire deposition of the ammonium sulfate in said saturation bath by passing therethrough an extraneously derived neutral gaseous evaporating medium, which acts as substantially the sole carrier for the evaporation requisite to effect the deposition of the ammonium sulfate; substantially as specified.

2. In a process for the recovery of ammonia from producer gas, the combination of steps that consists in: absorbing the ammonia from dust freed and tar freed producer gas by passing such gas, at nearly its saturation temperature, through an acid wash; conveying the mother liquor from such acid wash to a saturation bath; then effecting substantially the entire deposition of the ammonium sulfate in said saturation bath by passing therethrough a preheated extraneously derived neutral gaseous evaporating medium, which acts as substantially the sole carrier for the evaporation requisite to effect the deposition of the ammonium sulfate; substantially as specified.

3. In a process for the recovery of ammonia from producer gas, the combination of steps that consists in: absorbing the ammonia from the tar freed gas by passing such gas through an acid solution at a temperature sufficiently above the saturation point of the gas substantially to preclude diluting of such solution and yet at a temperature near enough such saturation point substantially to preclude deposition of ammonium sulfate in such acid solution; conducting the ammonia charged acid solution into a saturation bath; and then effecting substantially the entire deposition of the ammonium sulfate in said saturation bath by passing therethrough an extraneously derived neutral gaseous evaporating medium, which acts as substantially the sole carrier for the evaporation requisite to effect the deposition of the ammonium sulfate; substantially as specified.

4. In a process for the recovery of tar and ammonia from producer-gas, the combination of steps that consists in: precipitating the dust from the hot gas from the producer; then passing such gas in counter-current with the air going to the producer, to super-heat such air and partially cool said gas; then further cooling and washing said gas with water; then electrically precipitating the residue of the tar from such partially cooled but still hot gas; then passing such still hot and tar-freed gas through an acid-wash to absorb the ammonia; conveying the mother-liquor from the acid-wash to a saturator-bath; passing the ammonia-freed gas through final cooling and dehydrating stages; passing atmospheric air through a preheater and conveying such preheated air to and through said saturation-bath, to effect deposition of the ammonium sulfate; withdrawing and draining the ammonium sulfate and returning the liquor from such draining with the addition of fresh acid to the acid-wash; conveying the air from the saturation-bath to the aforesaid super-heating; and heating and charging the air with water, on its way to said super-heating, by passing such air in counter-current with the hot water from the first stage of the aforesaid final cooling of the gas; and conveying the water from such air heating operation back to the first stage of the final gas cooling; substantially as specified.

5. In a process for the recovery of tar and ammonia from producer-gas, the combination of steps that consists in: precipitating the dust from the hot gas from the producer; then passing such gas in counter-current with the air going to the producer, to super-heat such air and partially cool said gas; then further cooling and washing said gas with water; then electrically precipitating the residue of the tar from such partially cooled but still hot gas; then passing such still hot and tar-freed gas through an acid-wash to absorb the ammonia; conveying the mother-liquor from the acid-wash to a saturation-bath; passing the ammonia-freed gas through final cooling and dehydrating stages; passing air through said saturation-bath, to effect deposition of the ammonium sulfate; withdrawing and draining the ammonium sulfate and returning the liquor from such draining with the addition of fresh acid to the acid-wash; conveying the air from the saturation-bath to the aforesaid super-heating; and heating and charging the air with water, on its way to said super-heating, by passing such air in counter-current with the hot water from the first stage of the aforesaid final cooling of the gas; and conveying the water from such air heating operation back to the first stage of the final gas cooling; substantially as specified.

6. In a process for the recovery of ammonia from producer-gas, the combination of steps that consists in: absorbing the ammonia from the dust-freed and tar-freed producer-gas by passing such gas, at nearly its saturation temperature, through an acid-wash; conveying the mother-liquor from said acid-wash to a saturation-bath; cooling and dehydrating the ammonia-freed gas; passing preheated air through such saturation-bath to effect deposition of the ammonium sulfate; conducting the air from the saturation-bath through an air saturating operation, by passing such air in counter-current with the hot water from the aforesaid cooling of the ammonia-freed gas; super-heating said air and then conducting it to the producer; substantially as specified.

7. In a process for the recovery of ammonia from producer-gas, the combination of steps that consists in: absorbing the ammonia from the dust-freed and tar-freed producer-gas by passing such gas, at nearly its saturation temperature, through an acid-wash; conveying the mother-liquor from said acid-wash to a saturation-bath; cooling and dehydrating the ammonia-freed gas; passing preheated air through said saturation-bath to effect deposition of the ammonium sulfate; conducting the air from the saturation-bath through an air saturating operation, by passing such air in counter-current with the hot water from the aforesaid cooling of the ammonia-freed gas; super-heating said air by passing it in counter-current with the hot gas from the producer and then conveying the super-heated air to the producer; substantially as specified.

8. In a process for the recovery of ammonia from ammonia charged gas, the combination of steps that consists in: absorbing the ammonia from dust freed and tar freed gas by passing such gas, at nearly its saturation temperature, through an acid wash; conveying the mother liquor from such acid wash to a saturation bath; and then effecting substantially the entire deposition of the ammonium sulfate in said saturation bath by passing therethrough an extraneously derived neutral gaseous evaporating medium, which acts as substantially the sole carrier for the evaporation requisite to effect the deposition of the ammonium sulfate; substantially as specified.

9. In a process for the recovery of tar and ammonia from ammonia charged gas, the combination of steps that consists in: extracting the tar from the hot ammonia charged gas; passing such hot gas through an acid wash to absorb the ammonia of the gas; discharging the mother liquor from such acid wash into a saturation bath; and then effecting substantially the entire deposition of the ammonium sulfate in said saturation bath by passing therethrough a preheated extraneously derived neutral gaseous evaporating medium, which acts as substantially the sole carrier for the evaporation requisite to effect the deposition of the ammonium sulfate; substantially as specified.

10. In a process for the recovery of ammonia from ammonia charged gas, the combination of steps that consists in: absorbing the ammonia from the tar freed gas by passing such gas through an acid wash at a temperature sufficiently above the saturation point of the gas substantially to preclude diluting of said solution and yet at a temperature near enough said saturation point substantially to preclude deposition of ammonium sulfate in said acid solution; conducting the ammonia charged acid solution into a saturation bath; and then effecting substantially the entire deposition of the ammonium sulfate in said saturation bath by passing therethrough an extraneously derived neutral gaseous evaporating medium, which acts as substantially the sole carrier for the evaporation requisite to effect the deposition of the ammonium sulfate, substantially as specified.

11. In a process for the recovery of ammonia from ammonia charged gas, the combination of steps that consists in: passing such gas through an acid wash to absorb the ammonia; conveying the mother liquor from such acid wash to a saturation bath; and then effecting substantially the entire deposition of the ammonium sulfate in said saturation bath by passing therethrough an extraneously derived neutral gaseous evaporating medium, which acts as substantially the sole carrier for the evaporation requisite to effect the deposition of the ammonium sulfate; substantially as specified.

12. In a process for the recovery of tar and ammonia from ammonia charged gas, the combination of steps that consists in: extracting the tar from the hot ammonia charged gas; passing such hot gas through an acid wash to absorb the ammonia of the gas; discharging the mother liquor from such acid wash into a saturation bath; and then effecting substantially the entire deposition of the ammonium sulfate in said saturation bath by passing therethrough an extraneously derived neutral gaseous evaporating medium, which acts as substantially the sole carrier for the evaporation requisite to effect the deposition of the ammonium sulfate; substantially as specified.

13. In a process for the recovery of tar and ammonia from producer-gas, the combination of steps that consists in: passing tar-freed producer-gas, at about its saturation-temperature, through an acid-wash to absorb the ammonia from the gas; conveying the mother-liquor from such acid-wash to a saturation-bath; passing super-heated air through said saturation-bath to effect deposition of ammonium sulfate; reheating the air from said saturation-bath; and conveying such air to the producer; substantially as described.

In testimony whereof I have hereunto set my hand this 15th day of August, 1919.

JOSEPH BECKER.